United States Patent
Hoda

(10) Patent No.: US 7,626,352 B2
(45) Date of Patent: Dec. 1, 2009

(54) CONTROL DEVICE FOR STEPPING MOTOR

(75) Inventor: Akihiko Hoda, Kashiwa (JP)

(73) Assignee: Oriental Motor Co., Ltd., Tokyo (JP)

( * ) Notice: Subject to any disclaimer, the term of this patent is extended or adjusted under 35 U.S.C. 154(b) by 307 days.

(21) Appl. No.: 11/851,859

(22) Filed: Sep. 7, 2007

(65) Prior Publication Data

US 2008/0272730 A1  Nov. 6, 2008

(30) Foreign Application Priority Data

May 26, 2006  (JP)  ............... 2006-147353

(51) Int. Cl.
   *H02P 8/14*  (2006.01)
(52) U.S. Cl. .................. 318/685; 318/560; 318/671
(58) Field of Classification Search ................. 318/685, 318/671, 560
   See application file for complete search history.

(56) References Cited

U.S. PATENT DOCUMENTS 4,803,414 A * 2/1989 Kato ........................ 318/696
5,523,634 A * 6/1996 Takahashi et al. ......... 310/49.07
6,850,027 B2 * 2/2005 Kuwano et al. ............. 318/685

FOREIGN PATENT DOCUMENTS

JP   11-113289   4/1999
JP    3715276    9/2005

* cited by examiner

*Primary Examiner*—Bentsu Ro
*Assistant Examiner*—David S Luo
(74) *Attorney, Agent, or Firm*—Alston & Bird LLP

(57) ABSTRACT

A control device for a stepping motor is provided that can reduce torque generated by a motor and control the expansion of a speed deviation when the rotational speed of a rotor exceeds a speed command. The control device includes first judging means (27) for judging whether a positional deviation of a rotor is within a predetermined range, second judging means (28) for judging whether a sign of the positional deviation and a sign of a speed deviation coincide with each other, and phase setting means (34 to 35) for setting a winding current command phase.

12 Claims, 4 Drawing Sheets

CONTROL DEVICE FOR STEPPING MOTOR

BACKGROUND OF THE INVENTION

1. Field of the Invention

The present invention relates to a control device for a stepping motor, and, more particularly to a technique for lead angle control.

2. Description of the Related Art

In general, a control device for a stepping motor uses a pulse signal as a command signal. In other words, the control device commands a position with a pulse number and commands speed with a pulse frequency. Examples of techniques in the past for setting a lead angle value corresponding to the torque of the stepping motor in such a control device are disclosed in Japanese Patent No. 3715276 and Japanese Patent Application Laid-Open No. 11-113289. In a technique 1 disclosed in Japanese Patent No. 3715276 and a technique 2 disclosed in Japanese Patent Application Laid-Open No. 11-113289, a current phase $\theta_i$ of each phase winding is set as described below.

Technique 1

When $\delta_\theta < 90°$ $\theta_i = \theta_{com}$

When $\delta_\theta > 90°$ $\theta_i = \theta_{fb} + 90° + K_V \cdot \omega + K_e \cdot \omega \cdot \delta_\theta$ where $\theta_{com}$ is a position command, $\theta_{fb}$ is a rotor position, $\delta_\theta$ is a positional deviation, $\theta_i$ is a current phase, $K_V$ is a proportional constant, $K_e$ is a proportional constant, and $\omega$ is rotor speed.

Technique 2

When $\delta_\theta < 90° + K_V \cdot \omega_{fb}$ $\theta_i = \theta_{com}$

When $\delta_\theta > 90°$ $\theta_i = \theta_{fb} + 90° + K_V \cdot \omega_{fb}$ where $\omega_{fb}$ is rotor speed.

According to the techniques in the past, the rotor position command and the rotor position are compared. When the positional deviation is within a predetermined range, an excitation phase is set with the position command as a stable point. When the positional deviation exceeds the predetermined range, a lead angle value is set to an optimum value. The optimum lead angle value in the techniques in the past means a lead angle value with which maximum torque can be generated with respect to the speed $\omega_{fb}$.

However, in the techniques in the past, when the positional deviation exceeds the predetermined range, a motor is accelerated by the maximum torque that can be generated. Therefore, rotational speed of the rotor rotating to a position of the position command (a target position) may substantially exceed speed of a speed command (target speed) to cause a deficiency described below.

For example, after a rotor shaft is rotated by an external force, when the rotor shaft is opened, the rotor rotates to return to an original position with the maximum torque. In returning to the original position, it is likely that the rotational speed of the rotor reaches an abnormal speed. Since the rotor is not decelerated until the rotor reaches near the original position, because of the inertia of the rotor and a load, the rotor may pass over a position where the rotor should stop. When the inertia is large, the rotor may be unable to stop while repeatedly passing over the position and moving back. A similar phenomenon can occur because of insufficient acceleration torque during operation, fluctuation in a load, and the like.

OBJECT AND SUMMARY OF THE INVENTION

The present invention has been devised in view of the problems in the past and it is an object of the present invention to provide a control device for a stepping motor that can reduce torque generated by a motor and control the expansion of a speed deviation when the rotational speed of a rotor exceeds a speed command.

In order to attain the object, the present invention provides a control device for a stepping motor that determines, on the basis of a rotor position command ($\theta_{com}$) for indicating a position of a rotor and a rotor position ($\theta_{fb}$) as an actual position of the rotor, a phase ($\theta_i$) of a winding current command, which commands an electric current fed to a winding, and forms current commands ($I_{acom}$ and $I_{bcom}$) for respective phases on the basis of the winding current command phase ($\theta_i$). The control device includes positional-deviation calculating means (30) for calculating a deviation ($\delta_\theta$) between the position command and the rotor position, rotor-speed-command calculating means (21) for calculating a rotor speed command ($\omega_{com}$) on the basis of the position command, rotor-speed calculating means (22) for calculating rotor speed ($\omega_{fb}$) on the basis of the rotor position, speed-deviation calculating means (31) for calculating a deviation ($\delta_\omega$) between the rotor speed command and the rotor speed, fixed-value generating means (24) for generating a positive fixed value (+K) and a negative fixed value (−K) when the positional deviation is positive and negative, respectively, first judging means (27) for judging whether the positional deviation is within a predetermined range, second judging means (28) for judging whether a sign of the positional deviation and a sign of the speed deviation coincide with each other, and phase setting means (34 to 35) for setting the winding current command phase on the basis of the rotor position command, when the positional deviation is within the predetermined range, setting the winding current command phase on the basis of a value obtained by adding up the rotor position, the fixed value, and a lead angle correction value corresponding to the rotor speed when the positional deviation exceeds the predetermined range and a sign of the positional deviation and a sign of the speed deviation coincide with each other, and setting the winding current command phase on the basis of a value obtained by adding up the rotor position, the fixed value, a lead angle correction value corresponding to the rotor speed, and the speed deviation multiplied by a predetermined constant ($K_{do}$) when the positional deviation exceeds the predetermined range and a sign of the positional deviation and a sign of the speed deviation do not coincide with each other.

It is desirable that the fixed value is a value equivalent to an electrical angle 90°.

For example, the predetermined range is set to have a lower limit value obtained by adding up the negative fixed value and a value defined by a function ($f(\omega_{fb})$) of the rotor speed and have an upper limit value obtained by adding up the positive fixed value and a value defined by the function of the rotor speed.

For example, the predetermined range is set to have a lower limit value obtained by adding up the negative fixed value and a value obtained by multiplying the rotor speed by a predetermined coefficient ($K_V$) and have an upper limit value obtained by adding up the positive fixed value and a value obtained by multiplying the rotor speed by the predetermined coefficient. In this case, the predetermined coefficient ($K_V$) may be 0.

The lead angle correction value is set to a value defined by the function ($f(\omega_{fb})$) of the rotor speed. The lead angle correction value may be a value obtained by adding up a value as a product of the predetermined coefficient ($K_V$) and the rotor speed or a value as a product of the predetermined coefficient ($K_V$) and the rotor speed and a value as a product of the predetermined coefficient ($K_e$), the rotor speed, and the positional deviation.

The winding current command phase set on the basis of the rotor position command may include the speed deviation.

According to the present invention, an excitation phase for generating maximum torque is set when rotor rotational speed is lower than a speed command. The excitation phase is set to reduce torque generated by a motor and control the expansion of a speed deviation when the rotor rotational speed exceeds the speed command. Therefore, it is possible to prevent excessive rotational speed of the rotor and a hunting action at the time when a positional deviation exceeds a predetermined range and stably and quickly position the rotor.

DETAILED DESCRIPTION OF PREFERRED EMBODIMENTS

Figure 1:
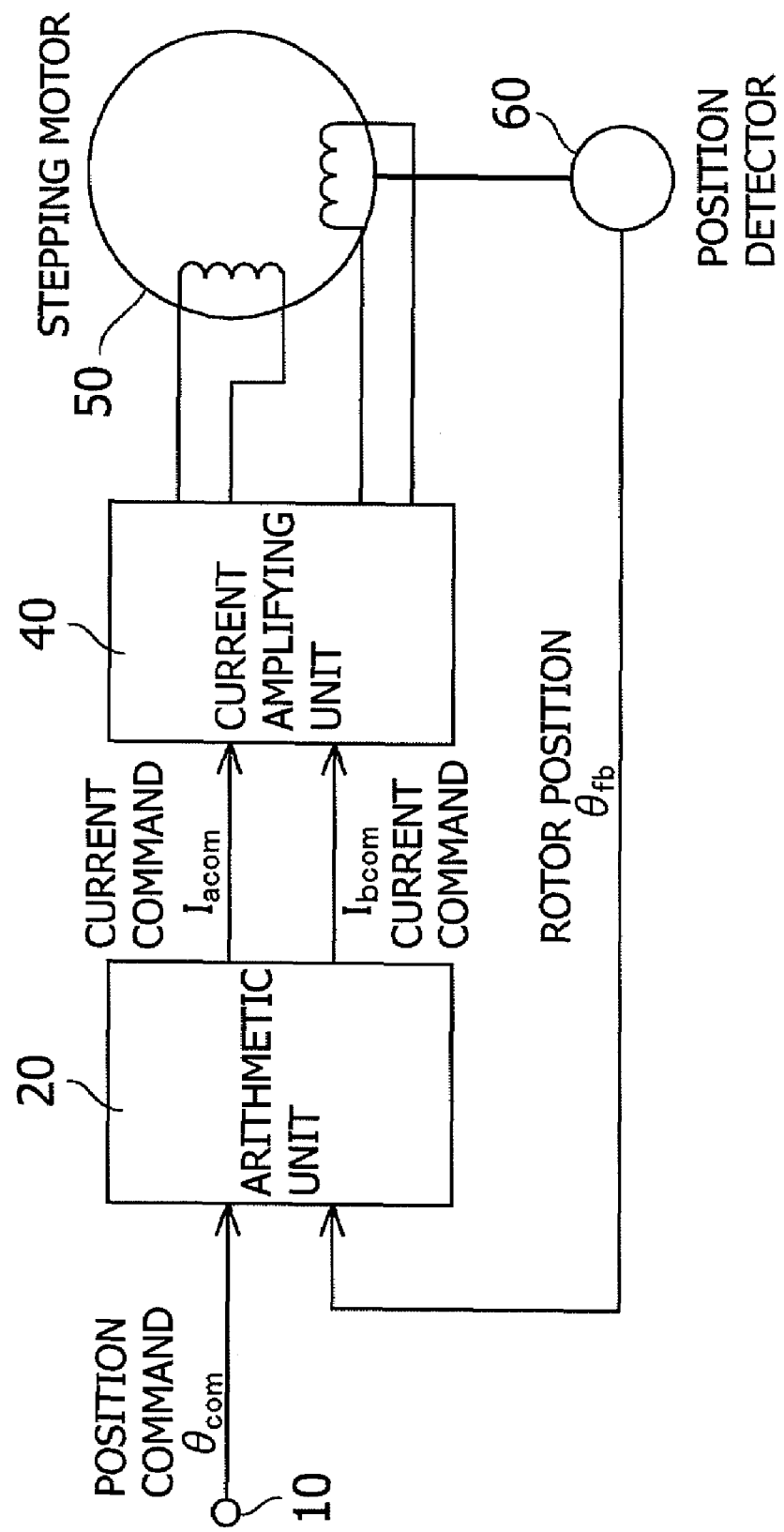
FIG. 1 is a block diagram showing an overall structure of a control device for a stepping motor according to a first embodiment of the present invention.

FIG. 1 is a block diagram showing an overall structure of a control device for a stepping motor according to an embodiment of the present invention.

In FIG. 1, a position command $\theta_{com}$ to a rotor of a stepping motor 50 is inputted to an arithmetic unit 20 in a form of a pulse signal through a position command input terminal 10. A position detector 60 is provided to detect an actual position of the rotor (hereinafter referred to as rotor position) $\theta_{fb}$. An output of the position detector 60 is inputted to the arithmetic unit 20. In this embodiment, a two-phase hybrid motor is used as the stepping motor 50.

The arithmetic unit 20 calculates an A-phase current command $I_{acom}$ and a B-phase current command $I_{bcom}$ on the basis of the position command $\theta_{com}$ and the rotor position $\theta_{fb}$, as described later. A current amplifying unit 40 includes a well-known PWM inverter and outputs electric currents corresponding to the current commands $I_{acom}$ and $I_{bcom}$ to respective phase windings of the stepping motor 50.

Figure 2:
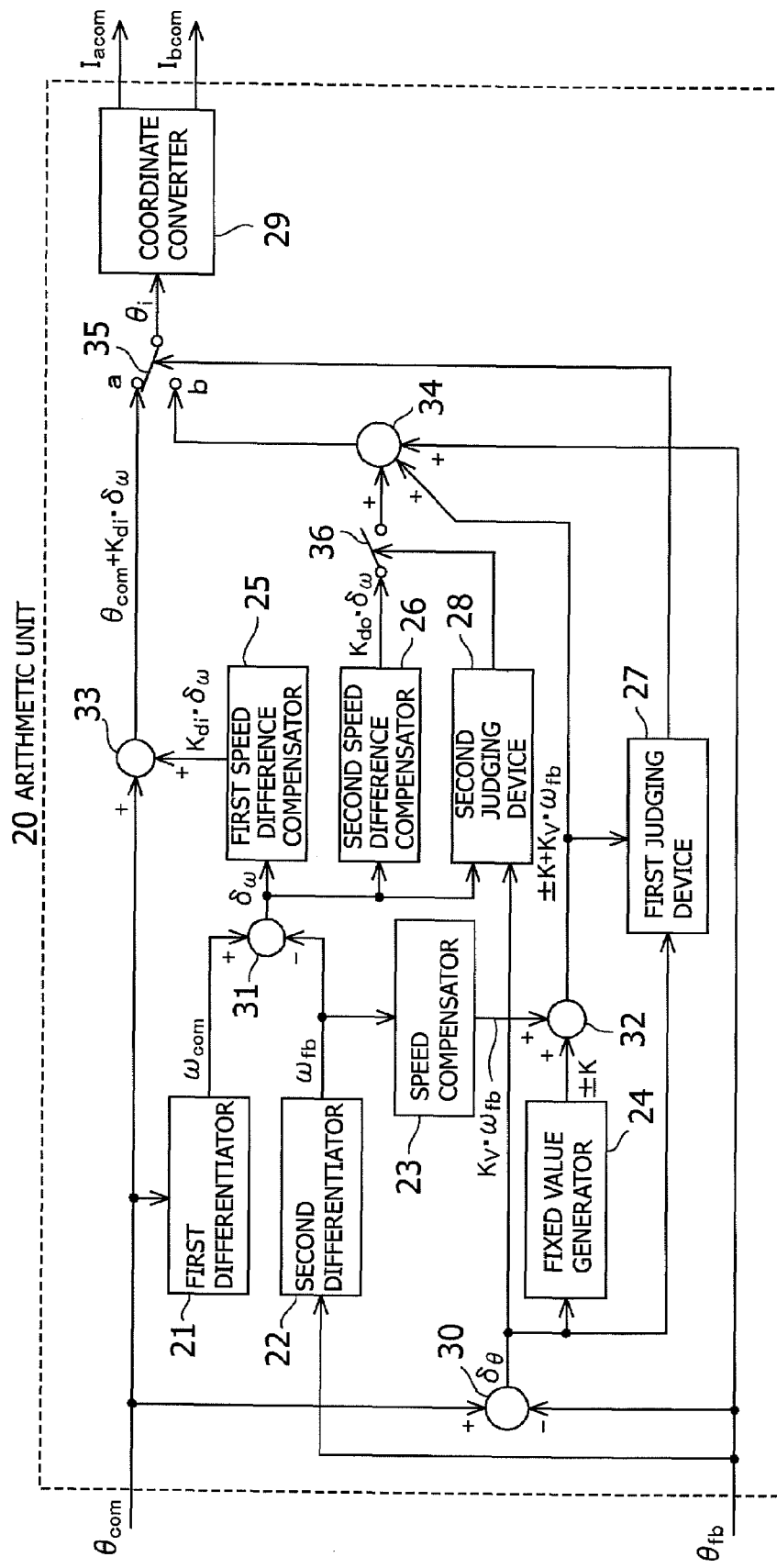
FIG. 2 is a block diagram showing an example of a structure of an arithmetic unit.

FIG. 2 is a block diagram showing details of the arithmetic unit 20.

In FIG. 2, a first subtractor 30 calculates a deviation $\delta_\theta$ between the position command $\theta_{com}$ and the rotor position $\theta_{fb}$ concerning the rotor. A first differentiator 21 differentiates the position command $\theta_{com}$ to form a speed command $\omega_{com}$. A second differentiator 22 differentiates the rotor position $\theta_{fb}$ to form rotor rotational speed $\omega_{fb}$. A speed compensator 23 multiplies the rotor rotational speed $\omega_{fb}$ by a proportional constant $K_V$ for speed compensation. A fixed value generator 24 generates a fixed value +K when the positional deviation $\delta_\theta$ is positive and generates a fixed value −K when the positional deviation $\delta_\theta$ is negative. As a value K, a value equivalent to an electrical angle 90° is desirable. In this embodiment, the value K is set to such a value.

A second subtractor 31 subtracts the rotor rotational speed $\omega_{fb}$ from the speed command $\omega_{com}$ and outputs speed deviation $\delta_\omega$. A first adder 32 adds up the fixed value K or −K generated by the fixed value generator 24 and an output $K_V \cdot \omega_{fb}$ of the speed compensator 23.

A first speed difference compensator 25 and a second speed difference compensator 26 multiply the speed deviation $\delta_\omega$ outputted from the subtractor 31 by proportional constants $K_{di}$ and $K_{do}$ for speed compensation, respectively.

A first judging device 27 performs comparative judgment of the positional deviation $\delta_\theta$ and an output $K+K_V \cdot \omega_{fb}$ or $-K+K_V \cdot \omega_{fb}$ of the first adder 32. When $-K+K_V \cdot \omega_{fb} < \delta_\theta < K+K_V \cdot \omega_{fb}$, the first judging device 27 connects a first switch element 35 to a terminal "a" side. When this condition is not satisfied, the first judging device 27 connects the switch element 35 to a terminal "b" side. A second judging device 28 turns off a second switch element 36 only when signs (positive or negative) of the positional deviation $\delta_\theta$ and the speed deviation $\delta_\omega$ coincide with each other.

A second adder 33 adds up the position command $\theta_{com}$ and an output $K_{di} \cdot \delta_\omega$ of the first speed difference compensator 25 and applies a result of the addition to the terminal "a" of the first switch element 35. A third adder 34 adds up an output $K_{do} \cdot \delta_\omega$ of the second speed difference compensator 26 applied via the second switch element 36, the output $K+K_V \cdot \omega_{fb}$ or $-K+K_V \cdot \omega_{fb}$ of the first adder 32, and the rotor position $\theta_{fb}$ and applies a result of the addition to the terminal "b" of the first switch element 35. A coordinate converter 29 outputs current commands $I_{acom} = K_i \cdot \sin \theta_i$ and $I_{bcom} = K_i \cdot \cos \theta_i$ on the basis of a current command phase $\theta_i$ described later given via the first switch element 35.

Specific actions of the control device according to this embodiment are explained below.

As described below, the control device according to this embodiment calculates the current command phase $\theta_i$ on the basis of the rotor position command $\theta_{com}$ and the rotor position $\theta_{fb}$ and forms the A-phase current command $I_{acom}$ and the B-phase current command $I_{bcom}$ from the current command phase $\theta_i$. The use of the current command phase $\theta_i$ calculated on the basis of the position command $\theta_{com}$ is basically the same as the use of the current command phase $\theta_i$ in the case of a normal open-loop stepping motor control system.

It is judged on the basis of a range of the positional deviation $\delta_\theta$ whether the current command phase $\theta_i$ is calculated on the basis of the rotor position command $\theta_{com}$ or the rotor position $\theta_{fb}$.

In the arithmetic unit 20 shown in FIG. 2, the first judging device 27 connects the switch element 35 to the terminal "a" side when a range of the positional deviation 60 satisfies the following formula (1).

$$-K+K_V \cdot \omega_{fb} < \delta_\theta < +K+K_V \cdot \omega_{fb} \quad (1)$$

Figure 3:
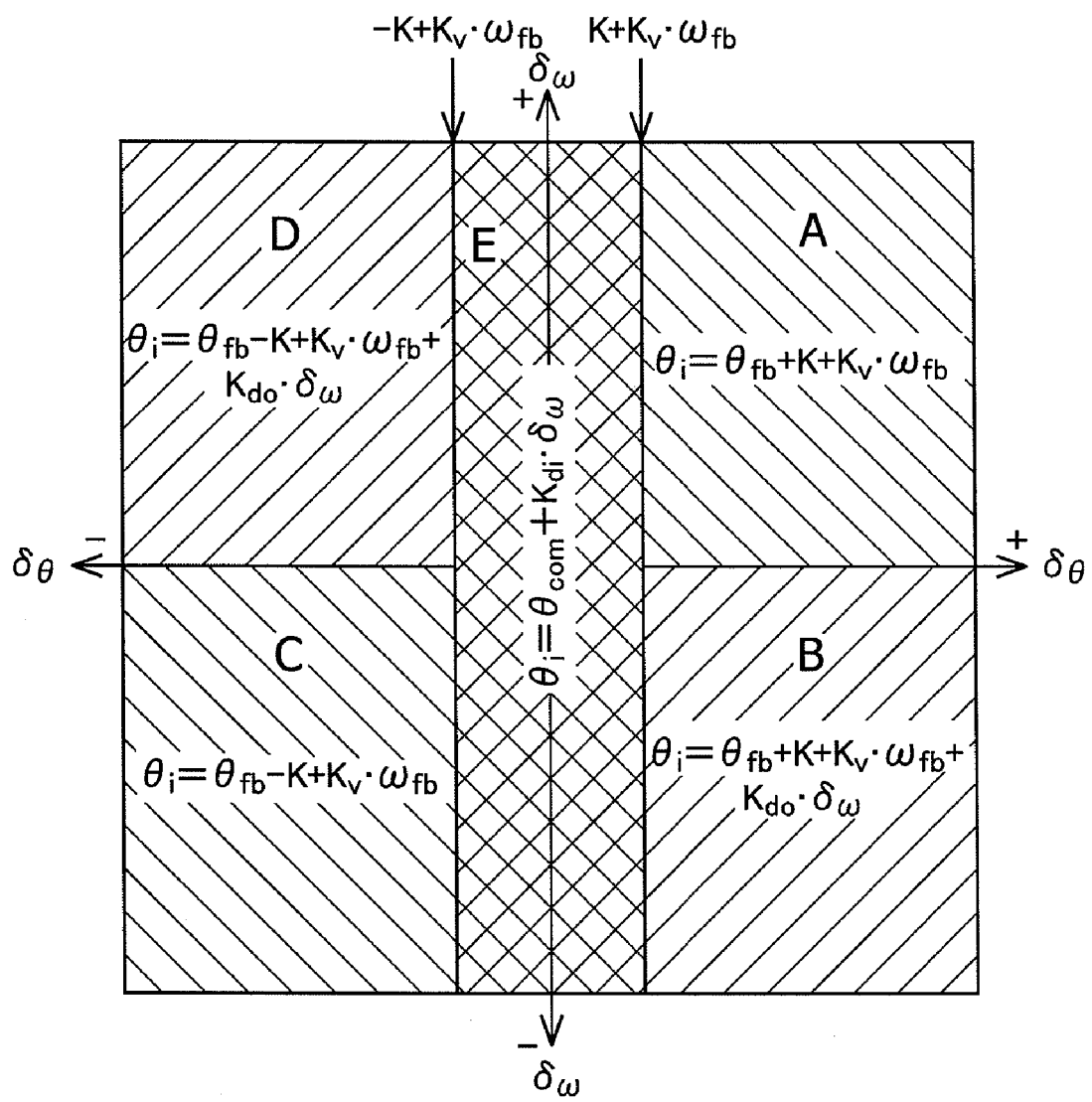
FIG. 3 is a diagram showing a formation pattern of a current command phase corresponding to a combination of polarities of a positional deviation and a speed deviation.

Consequently, as indicated by the following formula (2), a result of the addition by the adder 33 is outputted from the switch element 35 as the current command phase $\theta_i$. In this way, when the positional deviation $\delta_\theta$ is in the range indicated by Formula (1), the current command phase $\theta_i$ is calculated on the basis of the position command $\theta_{com}$ (see an area E in FIG. 3).

$$\theta_i = \theta_{com} + K_{di} \cdot \delta_\omega \quad (2)$$

As the fixed value K in Formula (1), it is desirable to use a value equivalent to an electrical angle 90°. However, the fixed value K is not limited to this. The current command phase $\theta_i$ may be set as $\theta_i = \theta_{com}$. However, if a term $K_{di} \cdot \delta_\omega$ based on the current deviation $\delta_\omega$ is added as in Formula (2), this is effective for controlling vibration during rotation.

The current command phase $\theta_i$ calculated on the basis of the rotor position $\theta_{fb}$ is explained below.

The first judging device 27 connects the switch element 35 to the terminal "b" side when a range of the positional deviation $\delta_\theta$ exceeds the range of Formula (1), i.e., when $\delta_\theta > +K + K_V \cdot \omega_{fb}$ or $\delta_\theta < -K + K_V \cdot \omega_{fb}$. In this case, the second judging device 28 turns off the switch element 36 only when signs (positive or negative) of the positional deviation $\delta_\theta$ and the speed deviation $\delta_\omega$ coincide with each other. Thus, eventually, four current command phases $\theta_i$ (see areas A to D in FIG. 3) corresponding to the following conditions "a" to "d" are calculated. These current command phases $\theta_i$ are outputted from the switch element 35 according to the conditions "a" to "d".

Condition "a": $\delta_\theta > +K + K_V \cdot \omega_{fb}$, $\delta_\theta > 0$, $\delta_\omega > 0$ (the switch element 36 is off)

$$\theta_i = \theta_{fb} + K + K_V \cdot \omega_{fb} \tag{3}$$

Condition "b": $\delta_\theta > +K + K_V \cdot \omega_{fb}$, $\delta_\theta > 0$, $\delta_\omega < 0$ (the switch element 36 is on)

$$\theta_i = \theta_{fb} + K + K_V \cdot \omega_{fb} + K_{d0} \cdot \delta_\omega \tag{4}$$

Condition "c": $\delta_\theta < -K + K_V \cdot \omega_{fb}$, $\delta_\theta < 0$, $\delta_\omega < 0$ (the switch element 36 is off)

$$\theta_i = \theta_{fb} - K + K_V \cdot \omega_{fb} \tag{5}$$

Condition "d": $\delta_\theta < -K + K_V \cdot \omega_{fb}$, $\delta_\theta < 0$, $\delta_\omega > 0$ (the switch element 36 is on)

$$\theta_i = \theta_{fb} - K + K_V \cdot \omega_{fb} + K_{d0} \cdot \delta_\omega \tag{6}$$

The current command phases $\theta_i$ calculated by Formula (2) and Formulas (3) to (6) are inputted to the coordinate converter 29 and converted into the current commands $I_{acom}$ and $I_{bcom}$ for the respective phases. The motor 50 is not limited to a two-phase motor and may be, for example, a three-phase or five-phase motor. In this case, the coordinate converter 29 converts the current command phase $\theta_i$ into current commands in a number corresponding to the number of phases of the motor 50.

According the current command phase $\theta_i$ calculated by Formula (2), the motor 50 is accelerated to follow command speed at maximum torque. In this case, since the term $K_V \cdot \omega_{fb}$ of speed compensation is included in the judgment formula (1), switching at a maximum torque generation point that compensates for a delay in an electric current and a delay in calculation due to winding inductance is possible.

On the other hand, according to the current command phases $\theta_i$ determined on the basis of the rotor position $\theta_{fb}$, i.e., the current command phases $\theta_i$ calculated by Formulas (3) to (6), the following effect is obtained.

For example, when the motor 50 is excessively rotates in a CW direction, the speed deviation $\delta_\omega$ is negative and the positional deviation $\delta_\theta$ is positive. Thus, the current command phase $\theta_i$ is determined on the basis of Formula (4). In this case, since a third term $K_{d0} \cdot \delta_\omega$ of Formula (4) is a negative value, a lead angle with respect to the rotor position $\theta_{fb}$ is reduced. As a result, the torque decreases.

In this way, in the example described above, an excitation phase is set to reduce generated torque and control a speed deviation. Thus, it is possible to prevent excessive rotation of the rotor and a hunting action (overshoot and undershoot) due to the expansion of the speed deviation and stably and quickly position the rotor. The stable and quick positioning of the rotor is also possible according to the current command phase $\theta_i$ determined by Formula (6).

When the term of $K_{d0} \cdot \delta_\omega$ in Formula (4) is larger than the fixed value K, torque in the opposite direction is generated. Thus, a value of the coefficient $K_{d0}$ is adjusted to obtain an appropriate speed deviation control effect.

According to the current command phases $\theta_i$ determined by Formula (3) and (5), a lead angle value, with which the motor generates maximum torque, is set.

The gist of the present invention is to use a lead angle value for generating maximum torque on the basis of a result of judgment of polarities of the positional deviation $\delta_\theta$ and the speed deviation $\delta_\omega$ at the time when the rotor rotational speed $\omega_{fb}$ does not reach the speed command $\omega_{com}$ and add a value obtained by multiplying the speed deviation $\delta_\omega$ by a coefficient to the lead angle value for generating the maximum torque (since polarity of $\delta_\omega$ is opposite to that of $\delta_\theta$, the lead angle value is reduced by this addition) on the basis of a result of the judgment of polarities at the time when the rotor rotational speed $\omega_{fb}$ exceeds the speed command $\omega_{com}$. Thus, there is no limitation on a method of approximately obtain the lead angle value for generating the maximum torque. Therefore, as a lead angle correction value (in the embodiment described above, $K_V \cdot \omega_{fb}$), not only a proportional function of the rotor speed $\omega_{fb}$ but also a quadric function and a cubic function $f \cdot (\omega_{fb})$ and the like may be used.

Figure 4:
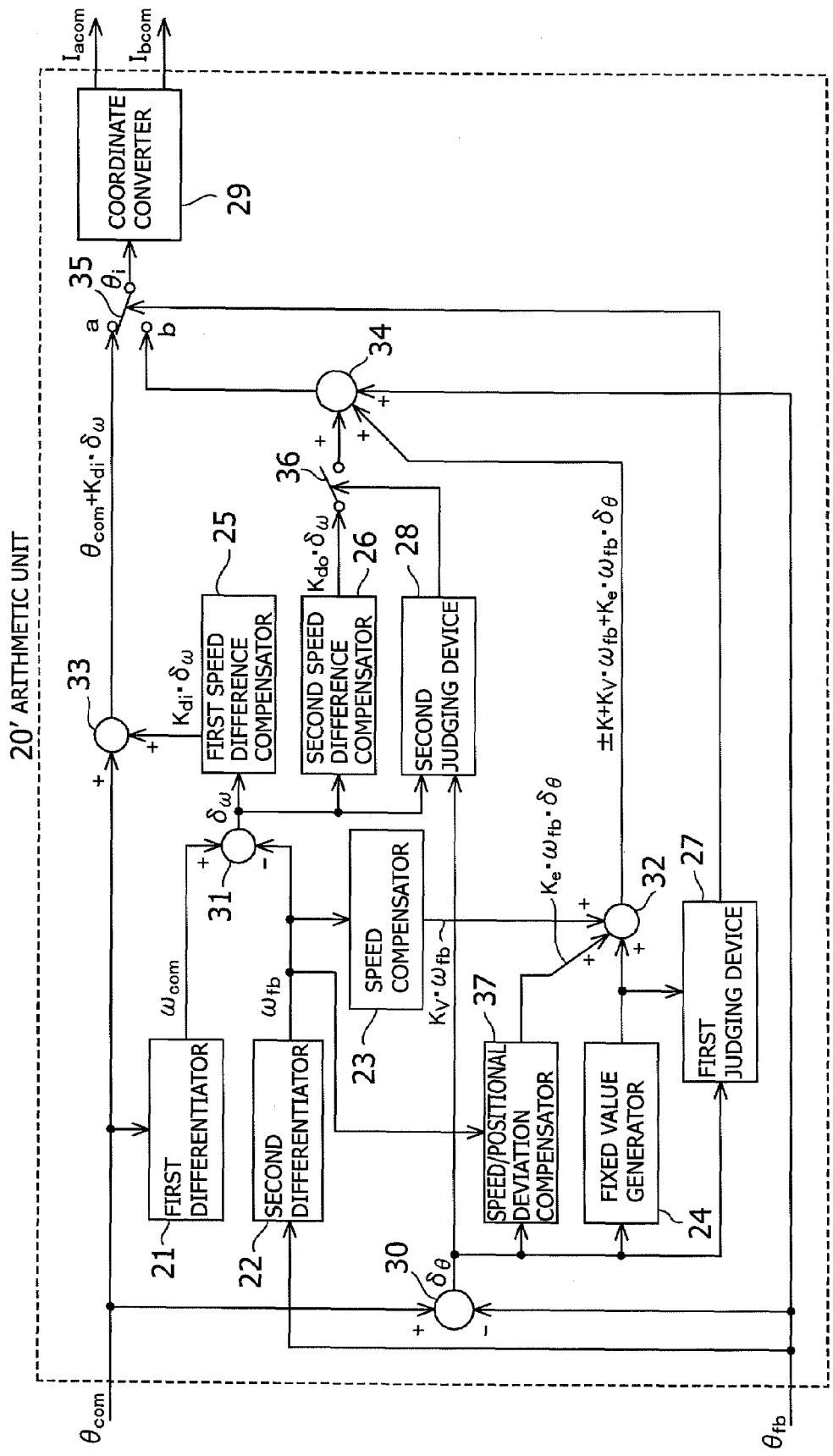
FIG. 4 is a block diagram showing another example of the structure of the arithmetic unit.

In the embodiment described above, the rotor speed $\omega_{fb}$ is used as the lead angle correction value. However, the positional deviation $\delta_\theta$ can also be used in addition to the rotor speed $\omega_{fb}$. FIG. 4 shows an arithmetic unit 20' that uses both the rotor speed $\omega_{fb}$ and the positional deviation $\delta_\theta$ as the lead angle correction value.

The arithmetic unit 20' is different from the arithmetic unit 20 according to the first embodiment in that a speed/positional deviation compensator 37 is provided and an output of the fixed value generator 24 is inputted to the second judging device 8.

In the arithmetic unit 20', the first judging device 27 connects the switch element 35 to the terminal "a" side when a range of the positional deviation $\delta_\theta$ satisfies the following Formula (7). In this case, the current command phase $\theta_i = \theta_{com} + K_{di} \cdot \delta_\omega$ indicated by Formula (2) is outputted via the switch element 35 as in the first embodiment. As in the first embodiment, the current command phase $\theta_i$ can be set as $\theta_i = \theta_{com}$.

$$-K < \delta_\theta < +K \tag{7}$$

When a range of the positional deviation $\delta_\theta$ exceeds the range of Formula (7), since the switch element 35 is connected to a terminal B side, the current command phase $\theta_i$ is set on the basis of the rotor position $\theta_{fb}$. The speed/positional deviation compensator 37 inputs the rotor rotational speed $\omega_{fb}$ and the rotor positional deviation $\delta_\theta$, executes an arithmetic operation for multiplying the rotor rotational speed $\omega_{fb}$ and the rotor positional deviation $\delta_\theta$ by a predetermined coefficient $K_e$, and inputs a result of the arithmetic operation $K_e \cdot \omega_{fb} \cdot \delta_\theta$ to the adder 32. Therefore, in the arithmetic unit 20', four current command phases $\theta_i$ are calculated according to the following conditions "a" to "d" and outputted from the switch element 35 according to the conditions "a" to "d".

Condition "a": $\delta_\theta > K$, $\delta_\theta > 0$, $\delta_\omega > 0$ (the switch element 36 is off)

$$\theta_i = \theta_{fb} + K + K_V \cdot \omega_{fb} + K_e \cdot \omega_{fb} \cdot \delta_\theta \tag{8}$$

Condition "b": $\delta_\theta > K$, $\delta_\theta > 0$, $\delta_\omega < 0$ (the switch element 36 is on)

$$\theta_i = \theta_{fb} + K + K_V \cdot \omega_{fb} + K_e \cdot \omega_{fb} \cdot \delta_\theta + K_{d0} \cdot \delta_\omega \quad (9)$$

Condition "c": $\delta_\theta < -K$, $\delta_\theta < 0$, $\delta_\omega < 0$ (the switch element 36 is off)

$$\theta_i = \theta_{fb} - K + K_V \cdot \omega_{fb} + K_e \cdot \omega_{fb} \cdot \delta_\theta \quad (10)$$

Condition "d": $\delta_\theta < -K + K_V \cdot \omega_{fb}$, $\delta_\theta < 0$, $\delta_\theta > 0$ (the switch element 36 is on)

$$\theta_i = \theta_{fb} - K + K_V \cdot \omega_{fb} + K_e \cdot \omega_{fb} \cdot \delta_\theta + K_{d0} \cdot \delta_\omega \quad (11)$$

An operational effect obtained by using the arithmetic unit 20' is the same as the operational effect obtained by using the arithmetic unit 20. Therefore, an explanation of the operational effect is omitted.

The invention claimed is:

1. A control device for a stepping motor that determines, on the basis of a rotor position command ($\theta_{com}$) for indicating a position of a rotor and a rotor position ($\theta_{fb}$) as an actual position of the rotor, a phase ($\theta i$) of a winding current command, which commands an electric current fed to a winding, and forms current commands ($I_{acom}$ and $I_{bcom}$) for respective phases on the basis of the winding current command phase ($\theta i$), the control device comprising:

positional-deviation calculating means for calculating a deviation ($\delta_\theta$) between the position command and the rotor position;

rotor-speed-command calculating means for calculating a rotor speed command ($\omega_{com}$) on the basis of the position command;

rotor-speed calculating means for calculating rotor speed ($\omega_{fb}$) on the basis of the rotor position;

speed-deviation calculating means for calculating a deviation ($\delta_\omega$) between the rotor speed command and the rotor speed;

fixed-value generating means for generating a positive fixed value (+K) and a negative fixed value (-K) when the positional deviation is positive and negative, respectively;

first judging means for judging whether the positional deviation is within a predetermined range;

second judging means for judging whether a sign of the positional deviation and a sign of the speed deviation coincide with each other; and phase setting means for setting the winding current command phase on the basis of the rotor position command, when the positional deviation is within the predetermined range, setting the winding current command phase on the basis of a value obtained by adding up the rotor position, the fixed value, and a lead angle correction value corresponding to the rotor speed when the positional deviation exceeds the predetermined range and a sign of the positional deviation and a sign of the speed deviation coincide with each other, and setting the winding current command phase on the basis of a value obtained by adding up the rotor position, the fixed value, a lead angle correction value corresponding to the rotor speed, and the speed deviation multiplied by a predetermined constant ($K_{do}$) when the positional deviation exceeds the predetermined range and a sign of the positional deviation and a sign of the speed deviation do not coincide with each other.

2. The control device for a stepping motor according to claim 1, wherein the fixed value is a value equivalent to an electrical angle 90°.

3. The control device for a stepping motor according to claim 2, wherein the predetermined range has a lower limit value obtained by adding up the negative fixed value and a value defined by a function ($f(\omega_{fb})$) of the rotor speed and has an upper limit value obtained by adding up the positive fixed value and a value defined by the function of the rotor speed.

4. The control device for a stepping motor according to claim 2, wherein the predetermined range has a lower limit value obtained by adding up the negative fixed value and a value obtained by multiplying the rotor speed by a predetermined coefficient ($K_V$) and has an upper limit value obtained by adding up the positive fixed value and a value obtained by multiplying the rotor speed by the predetermined coefficient.

5. The control device for a stepping motor according to claim 4, wherein the predetermined coefficient ($K_V$) is 0.

6. The control device for a stepping motor according to claim 1, wherein the predetermined range has a lower limit value obtained by adding up the negative fixed value and a value defined by a function ($f(\omega_{fb})$) of the rotor speed and has an upper limit value obtained by adding up the positive fixed value and a value defined by the function of the rotor speed.

7. The control device for a stepping motor according to claim 1, wherein the predetermined range has a lower limit value obtained by adding up the negative fixed value and a value obtained by multiplying the rotor speed by a predetermined coefficient ($K_V$) and has an upper limit value obtained by adding up the positive fixed value and a value obtained by multiplying the rotor speed by the predetermined coefficient.

8. The control device for a stepping motor according to claim 7, wherein the predetermined coefficient ($K_V$) is 0.

9. The control device for a stepping motor according to claim 1, wherein the lead angle correction value is a value defined by a function ($f(\omega_{fb})$) of the rotor speed.

10. The control device for a stepping motor according to claim 1, wherein the lead angle correction value is a value as a product of a predetermined coefficient ($K_V$) and the rotor speed.

11. The control device for a stepping motor according to claim 1, wherein the lead angle correction value is a value obtained by adding up a value as a product of a predetermined coefficient ($K_V$) and the rotor speed and a value as a product of a predetermined coefficient ($K_e$), the rotor speed, and the positional deviation.

12. The control device for a stepping motor according to claim 1, wherein the winding current command phase set on the basis of the rotor position command includes the speed deviation.

* * * * *

UNITED STATES PATENT AND TRADEMARK OFFICE
CERTIFICATE OF CORRECTION

PATENT NO. : 7,626,352 B2
APPLICATION NO. : 11/851859
DATED : December 1, 2009
INVENTOR(S) : Hoda It is certified that error appears in the above-identified patent and that said Letters Patent is hereby corrected as shown below:

Column 4,
Line 55, "deviation 60 satisfies" should read --deviation $\delta_\theta$ satisfies--.

Signed and Sealed this

Twenty-eighth Day of September, 2010

David J. Kappos
*Director of the United States Patent and Trademark Office*